(12) United States Patent
Callou et al.

(10) Patent No.: US 8,983,684 B2
(45) Date of Patent: Mar. 17, 2015

(54) METHOD OF DYNAMICALLY CONTROLLING THE ATTITUDE OF A DRONE IN ORDER TO EXECUTE A FLIP TYPE MANEUVER AUTOMATICALLY

(75) Inventors: Francois Callou, Paris (FR); Michael Rischmuller, Aix-en-Provence (FR)

(73) Assignee: Parrott, Paris (FR)

( * ) Notice: Subject to any disclaimer, the term of this patent is extended or adjusted under 35 U.S.C. 154(b) by 269 days.

(21) Appl. No.: 13/493,643

(22) Filed: Jun. 11, 2012

(65) Prior Publication Data
US 2013/0006448 A1  Jan. 3, 2013

(30) Foreign Application Priority Data
Jun. 28, 2011  (FR) .................................... 11 55779

(51) Int. Cl.
| G05D 1/00 | (2006.01) |
|---|---|
| G05D 1/06 | (2006.01) |
| G05D 3/00 | (2006.01) |
| G06F 7/00 | (2006.01) |
| G06F 17/00 | (2006.01) |
| G05D 1/08 | (2006.01) |
| A63H 27/00 | (2006.01) |

(52) U.S. Cl.
CPC .............. *G05D 1/0858* (2013.01); *A63H 27/12* (2013.01)
USPC ............... 701/5; 701/2; 701/4; 701/1; 701/12

(58) Field of Classification Search
USPC .......................................................... 701/5
See application file for complete search history.

(56) References Cited

U.S. PATENT DOCUMENTS

| 8,473,125 | B2* | 6/2013 | Rischmuller et al. ............ 701/11 |
|---|---|---|---|
| 8,474,761 | B2* | 7/2013 | Callou .......................... 244/183 |
| 8,498,447 | B2* | 7/2013 | Derbanne ..................... 382/103 |
| 8,662,438 | B2* | 3/2014 | Savoye et al. .............. 244/17.13 |
| 2008/0294305 | A1* | 11/2008 | Roesch .............................. 701/3 |
| 2011/0049290 | A1* | 3/2011 | Seydoux et al. ........... 244/17.13 |
| 2011/0221692 | A1* | 9/2011 | Seydoux et al. .............. 345/173 |

OTHER PUBLICATIONS

Daniel Mellinger and Vijay Kumar. Minimum Snap Trajectory Generation and Control for Quadrotors. Int. Conf. on Robotics and Automation, Shanghai, China, May 2011.*
Daniel Mellinger, Nathan Michael, and Vijay Kumar. Trajectory Generation and Control for Precise Aggressive Maneuvers with Quadrotors. Int. Symposium on Experimental Robotics, Dec. 2010.*

(Continued)

*Primary Examiner* — Nicholas Kiswanto
(74) *Attorney, Agent, or Firm* — Haverstock & Owens LLP (57) ABSTRACT

This method controls the drone in order to flip through a complete turn about its roll axis or its pitching axis. It comprises the steps of: a) controlling its motors simultaneously so as to impart a prior upward vertical thrust impulse to the drone; b) applying different and non-servo-controlled commands to the motors so as to produce rotation of the drone about the axis of rotation of the flip, from an initial angular position to a predetermined intermediate angular position; and then c) applying individual control to the motors, servo-controlled to a reference target trajectory, so as to finish off the rotation of the drone through one complete turn about the axis of rotation, progressively from the intermediate angular position with a non-zero angular velocity to a final angular position with a zero angular velocity.

10 Claims, 4 Drawing Sheets

(56) References Cited

OTHER PUBLICATIONS

Lupashin, Sergei et al., "A Simple Learning Strategy for High-Speed Quadrocopter Multi-Flips", 2010 IEEE International Conference on Robotics and Automation, Anchorage Convention District, May 3-8, 2010, pp. 1642-1648.

Gillula, Jereny H., "Design of Guaranteed Safe Maneuvers Using Reachable Sets: Autonomous Quadrotor Aerobatics in Theory and Practice", 2010 IEEE International Conference on Robotics and Automation, Anchorage Convention District, May 3-8, 2010, pp. 1649-1654.

* cited by examiner

METHOD OF DYNAMICALLY CONTROLLING THE ATTITUDE OF A DRONE IN ORDER TO EXECUTE A FLIP TYPE MANEUVER AUTOMATICALLY

FIELD OF THE INVENTION

The invention relates to piloting rotary-wing drones such as quadricopters or the like.

BACKGROUND OF THE INVENTION

Such drones have multiple rotors driven by respective motors that can be controlled independently in order to control the attitude and the speed of the drone.

A typical example of such a drone is the AR.Drone from Parrot SA, Paris, France, which is a quadricopter fitted with a series of sensors (accelerometers, three-axis gyros, altimeter). The drone also has a forward-looking camera picking up an image of the scene towards which the drone is heading, and a vertically-pointed camera picking up an image of the overflown terrain.

The drone is piloted by the user by means of a remote-control device—referred to below as an "appliance"—that is connected to the drone by a radio link.

WO 2010/061099 A1 (Parrot SA) in particular describes such a drone and how it can be piloted via a media player or a telephone having a touch screen and an incorporated accelerometer, e.g. a cell phone of the iPhone type or a media player or a multimedia tablet of the iPod Touch or iPad type (trademarks registered by Apple Inc., USA). Those appliances incorporate the various control members needed for detecting piloting commands and for bidirectional exchange of data with the drone via a local network wireless link of the type provided by WiFi (IEEE 802.11) or Bluetooth (registered trademarks). In particular, the appliance is provided with a touch screen that displays the image picked up by the forward-looking camera, and having superposed thereon a certain number of symbols that enable commands to be activated by mere contact of the user's finger on the touch screen. The display also enables "immersive piloting" in which the user, instead of piloting the drone while looking at the drone, makes use of the image from the camera as though the pilot were on board the drone.

The invention relates more particularly to automatically executing flip maneuvers of the "roll" type (rotation of the drone through a complete revolution about its roll axis), or of the "loop" type (rotation of the drone through a complete revolution about its pitching axis).

The roll may be to left or to right depending on the direction of rotation. It may also be constituted by a sequence of complete revolutions one after another; the description below relates to a maneuver constituted by a single revolution, however that description is not of a limiting character. The description also relates to the maneuver being performed from a configuration in which the drone is initially stationary, hovering, but that configuration is not limiting either: the roll may be performed for example together with a horizontal speed component, with a point on the drone then describing a trajectory in an absolute frame of reference that is helical rather than circular.

The loop may be forwards or backwards, depending on whether the rotation is initiated by the drone performing a nose-up or a nose-down maneuver, respectively. It should be observed that a loop differs from a roll only by the axis of rotation involved (pitching axis instead of roll axis). As a result, the description below relates only to executing a roll, but everything that is mentioned concerning a roll can be transposed to executing a loop, mutatis mutandis, with a different axis of rotation being selected.

The article by S. Lupashin et al. "A simple learning strategy for high-speed quadrocopter multi-flips", Proceedings of the 2010 IEEE International Conference on Robotics and Automation, May 2010, pp. 1642-1648 describes how to control a drone of the quadricopter type in order to perform such a maneuver.

The technique described in that document consists in imparting an initial rotary impulse to the drone, with the magnitude of the impulse being calculated so that the drone reaches a final altitude that is as close as possible to the horizontal at the end of the maneuver.

Nevertheless, since the roll is executed by the drone in an open loop (no servo-control), it is not guaranteed in any way that the drone will indeed be horizontal at the end of the maneuver, or in other words that its angular speed will be zero after pivoting through 360°.

In order to mitigate that risk of overshoot (more than one complete revolution) or of undershoot (less than one complete revolution), the authors propose using successive iterations to adjust the durations of the various sequences for controlling the roll so as to come as close as possible to the ideal figure: one complete revolution, neither more nor less, with zero final angular velocity after rotating through 360°.

As a result, it is not possible to achieve the looked-for result on the first attempt. On the contrary, that requires a large number of successive approximations, and according to that article about 40 to 50 iterations of the adjustment algorithm.

Furthermore, even after adjusting the various parameters, proper execution of the maneuver can be disturbed by various external factors such as gusts of wind, turbulence close to a wall, etc.

The article by J. H. Gillula et al. "Design of guaranteed safe maneuvers using reachable sets: autonomous quadrotor aerobatics in theory and practice", Proceedings of the 2010 IEEE International Conference on Robotics and Automation, May 2010, pp. 1649-1654, describes a comparable technique for causing a quadricopter to execute back-flips during horizontal flight, however that technique presents the same drawbacks and limitations as those explained above.

In practice, proper execution of a roll or a loop encounters several difficulties.

One of them is associated with the fact that when the motors are controlled to cause the drone to perform the desired rotation, as a result of the reversal of left/right or forward/backward thrust that serves to start the rotation about the roll axis or the pitching axis, the drone is no longer supported and will therefore lose altitude between the beginning and the end of the maneuver (unlike performing one complete revolution about a yaw axis, where the drone remains substantially flat throughout the rotation).

As described in the above-mentioned article by Lupashin, that difficulty can be resolved by controlling the motors of the drone simultaneously in such a manner as to impart a prior upward vertical thrust impulse thereto before beginning the rotation. This gives sufficient vertical impetus to the drone to ensure that once it has finished off the maneuver, it is substantially back at the same altitude as it had initially.

However this prior vertical thrust that is applied in an open loop to all four motors does not avoid the risk of being offset sideways in the event of the attitude of the drone not being strictly horizontal at the moment the impulse is applied.

As explained above, another difficulty lies in accurate looping rotation through one complete revolution, i.e. rotation through 360° without angular overshoot, which would then give rise to the drone oscillating about its final horizontal position. That drawback is particularly marked when the maneuver is performed quickly—but such speed is essential not only for accentuating the spectacular nature of the maneuver, but also, and above all, for limiting the above-mentioned effects of losing support during the execution of the maneuver.

OBJECT AND SUMMARY OF THE INVENTION

Thus, the problem of the invention is to be able to perform a flip maneuver of the roll or loop type through one complete revolution without the drone losing altitude between the starting instant and the ending instant of the maneuver, and while performing the maneuver in a manner that is neat and accurate without oscillating about the final horizontal position.

To do this, the invention provides a method of dynamically controlling the attitude of a rotary-wing drone having multiple rotors driven by respective individually-controlled motors, for automatically executing a roll or loop type preprogrammed maneuver in which the drone performs a complete turn about an axis of rotation constituted by the roll axis or the pitching axis respectively of the drone.

As disclosed in the above-mentioned article by Lupashin et al., and on receiving an instruction to trigger the preprogrammed maneuver, the method of the invention comprises executing a sequence of steps of:

a) simultaneously controlling the motors in such a manner as to impart a prior upward vertical thrust impulse to the drone; and b) controlling the motors in such a manner as to cause the drone to rotate about the axis of rotation from an initial angular position to a final angular position with zero angular velocity, this step including a stage of subjecting the motors to open-loop control.

In a manner characteristic of the invention, step b) of the method comprises the successive substeps of:

b1) applying individual non-servo-controlled control to the motors so as to cause the drone to rotate about the axis of rotation from an initial angular position to a predetermined intermediate angular position; and then b2) applying individual control to the motors, servo-controlled to a reference target trajectory, so as to finish off the rotation of the drone through one complete turn about the axis of rotation, progressively from the intermediate angular position with a non-zero angular velocity to a final angular position with a zero angular velocity.

The reference target trajectory of step b2) may be a target trajectory in terms of angular velocity and/or a target trajectory in terms of angle.

In a preferred implementation, step b2) comprises the substeps consisting in:

b21) imparting a value for stopping time between the intermediate angular position and the final angular position;

b22) measuring the angular velocity of the drone on reaching the predetermined intermediate angular position;

b23) from said stopping time imparted in step b21) and from the measurement acquired in step b22), setting parameters of a predetermined predictive function that models optimum continuous variation of the angular position of the drone as a function of time from the intermediate angular position to the final angular position at the end of the imparted time; and b24) on the basis of the predictive function as set in step b23), generating setpoint values corresponding to a target angular position precalculated at a given instant, and applying said setpoint values to a servo-control loop controlling the motors of the drone.

In particular, the setpoint values are setpoints for the angle of inclination of the drone relative to its roll axis or relative to its pitching axis, as the case may be. The predetermined predictive function is a polynomial function, in particular of the third order, and the step b23) of setting the parameters of said function is a step of determining coefficients of the polynomial.

More precisely, the polynomial function is a function of the following type:

$$\phi(t) = a \cdot t^3 + b \cdot t^2 + c \cdot t + d$$

where:

$\phi(t)$ is the angular position corresponding to the setpoint value generated in step b24); and a, b, c, and d are the coefficients of the polynomial as set in step b23), such that:

$$a = \frac{1}{T^2} * \left( \frac{2 * \varphi_{initial}}{T} + P_{initial} \right)$$

$$b = -\frac{1}{T} * \left( \frac{3 * \varphi_{initial}}{T} + 2 * p_{initial} \right)$$

$$c = p_{initial}$$

$$d = \varphi_{initial}$$

where:

T is the value of the stopping time imparted in step b21);

$\phi_{initial}$ is the angular value of the intermediate angular position; and $p_{initial}$ is the angular velocity of the drone as measured in step b22) for the intermediate angular position.

Advantageously, the method provides for at least one reiteration of steps b22) and b23) when the drone reaches a predetermined angular position for redefining setpoints, this angular position for redefining setpoints lying between the intermediate angular position of step b2) and the final angular position, and the redefinition angular position being taken as a new intermediate angular position for setting the parameters in step b23).

Furthermore, step a) of simultaneously controlling the motors so as to impart an upward prior vertical thrust impulse to the drone is advantageously a step that is executed while conserving control over the attitude of the drone.

Finally, the method may further comprise, once the final angular position has been reached, a final step of:

c) transition to a hovering state of the drone with activation of a hovering flight control loop suitable for stabilizing the drone with a horizontal linear speed that is zero and an angle of inclination relative to ground that is zero.

The invention also provides software downloadable into a digital memory of a rotary wing drone, and comprising instructions that, on being executed on receiving instructions for triggering a preprogrammed maneuver of the flip type coming from a remote control appliance, implements a method of dynamically controlling the attitude of the drone as described above.

BRIEF DESCRIPTION OF THE DRAWINGS

There follows a description of an implementation of the method of the invention given with reference to the accompanying drawings in which the same numerical references are used from one figure to another to designate elements that are identical or functionally similar.

MORE DETAILED DESCRIPTION

There follows a description of an implementation of the invention.

Figure 1:
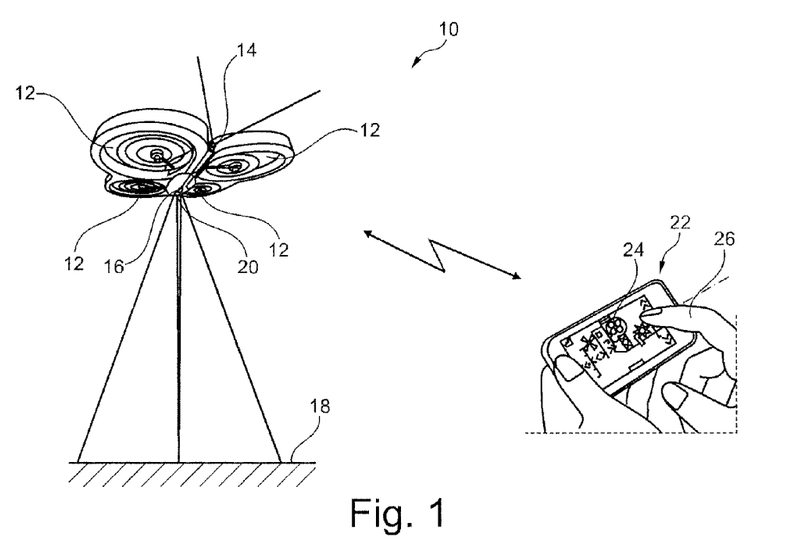
FIG. 1 is an overall view showing the drone and the associated remote control enabling the drone to be controlled remotely.

In FIG. 1, reference 10 is an overall reference designating a quadricopter type drone, e.g. the AR.Drone from Parrot SA, Paris, France, as described in particular in above-mentioned WO 2010/061099 A2, and also in WO 2009/109711 A2 (automatic stabilization system) and FR 2 915 569 A1 (system for controlling the drone by gyros and accelerometers).

The drone has four coplanar rotors 12 having their motors controlled independently by an integrated navigation and attitude control system. The drone also has a forward-looking camera 14 giving an image of the scene to which the drone is heading, and a vertically-pointed camera 16 giving an image of the ground 18 and also used for calculating horizontal speed in translation. Inertial sensors (accelerometers and gyros) serve to measure the angular velocities and the attitude angles of the drone with a certain degree of accuracy, i.e. they serve to measure the Euler angles describing the inclination of the drone relative to an absolute terrestrial frame of reference. An ultrasound telemeter 20 placed under the drone also provides a measurement of its altitude relative to the ground 18.

The drone 10 is piloted by a remote-control appliance 22 provided with a touch screen 24 displaying the image picked up by the forward-looking camera 14 with a certain number of symbols superposed thereon to enable piloting commands to be activated merely by the user's finger 26 making contact with the touch screen 24. As mentioned in the introduction, the appliance 22 is advantageously constituted by a telephone or a multimedia player having a touch screen and an incorporated accelerometer, for example an iPhone type cell phone, an iPod Touch type player, or an iPad type multimedia tablet, all of which are appliances that incorporate the various control members needed for displaying and detecting piloting commands, for displaying the image picked up by the forward-looking camera, and for exchanging data with the drone over a bidirectional radio link enabling piloting commands to be sent to the drone and, in the opposite direction, enabling the image picked up by the camera 14 to be transmitted together with state data about the drone. The radio link may in particular be a local area network of the type provided by WiFi (IEEE 802.11) or Bluetooth (registered trademarks). The remote control appliance 22 is also provided with inclination sensors enabling the attitude of the drone to be controlled by imparting corresponding inclinations to the appliance about roll and pitching axes (reference may be made to above-mentioned WO 2010/061099 A2 for further details on these aspects of the system).

The user pilots the drone directly by a combination of:
commands available on the touch screen, in particular "up/down" (corresponding to a throttle command), and "rotate left/right" (pivoting the drone about a yaw axis); and signals emitted by the inclination detector of the appliance: for example, in order to cause the drone to advance, the user inclines the appliance about the corresponding pitching axis, and in order to shift the drone to the right or to the left the user inclines the same appliance about the roll axis: thus, if the motors are controlled so that the drone tilts or "dives" downwards (inclination at a pitching angle), then it advances forwards at a speed that increases with an increasing angle of inclination; conversely, if the drone takes a "nose-up" position in the opposite direction, its speed will slow down progressively and then reverse, flying backwards. In the same manner, any angle of inclination about a roll axis (drone leaning to the left or to the right) will cause the drone to move linearly in horizontal translation to the right or to the left.

The drone also possesses an automatic and autonomous system for stabilizing it in hovering flight, which system is activated in particular as soon as the user takes the controlling finger away from the touch screen of the appliance, or automatically at the end of a take-off stage, or indeed in the event of an interruption in the radio link between the appliance and the drone. The drone then takes on a hovering state in which it is stationary and is maintained in a fixed position by the stabilizing autopilot system, without any intervention by the user.

Figure 2:
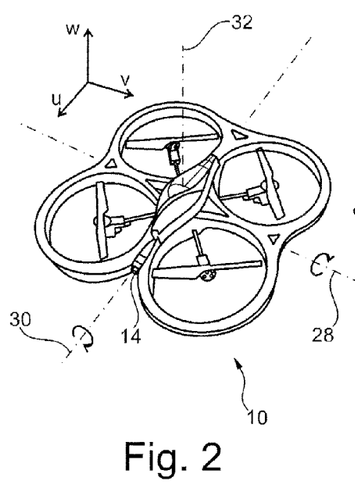
FIG. 2 is a perspective view of the drone, showing in particular its main axes of rotation as involved in controlling attitude.

FIG. 2 shows the drone 10 with its axes of rotation, respectively the pitching, roll, and yaw axes 28, 30, and 32, together with the frame of reference (u, v, w) tied to the body of the drone and relative to which the various equations modeling the dynamic behavior of the drone are expressed below.

The invention relates more particularly to executing a roll type flip maneuver, corresponding to turning through one complete turn about the roll axis 30, or a loop type flip maneuver, corresponding to turning through one complete turn about the pitching axis 28.

There follows a description of how a roll is executed, with the execution of a loop being identical, after permutating the roll and pitching axes 30 and 28.

Figure 3:
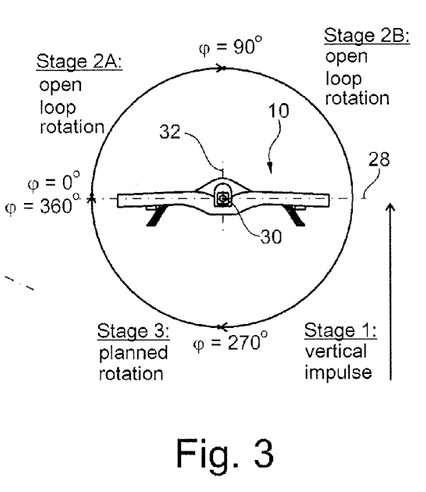
FIG. 3 is a front view of the drone, showing the various stages of rotation about the roll axis when executing a roll type maneuver.

FIG. 3 is a diagram showing the various stages of a roll, executed by definition at a constant pitching angle that is substantially zero, and with a roll axis that varies from $\phi=0°$ to $\phi=360°$.

In a manner characteristic of the invention, the execution of a roll comprises three successive stages, namely:
stage 1: prior vertical thrust impulse imparted to the drone so as to compensate for the loss of lift and for the thrust reversal that occurs while turning over, so that its altitude at the end of the roll ($\phi=360°$) is substantially equal to its initial altitude ($\phi=0°$);
stage 2: rotation imparted by sending open-loop commands directly to the motors; and
stage 3: finishing off the turn by planned, servo-controlled control of the motors in such a manner as to terminate the maneuver with the same final roll angle ($\phi=360°$) as the initial, zero roll angle ($\phi=0°$).

Figure 4:
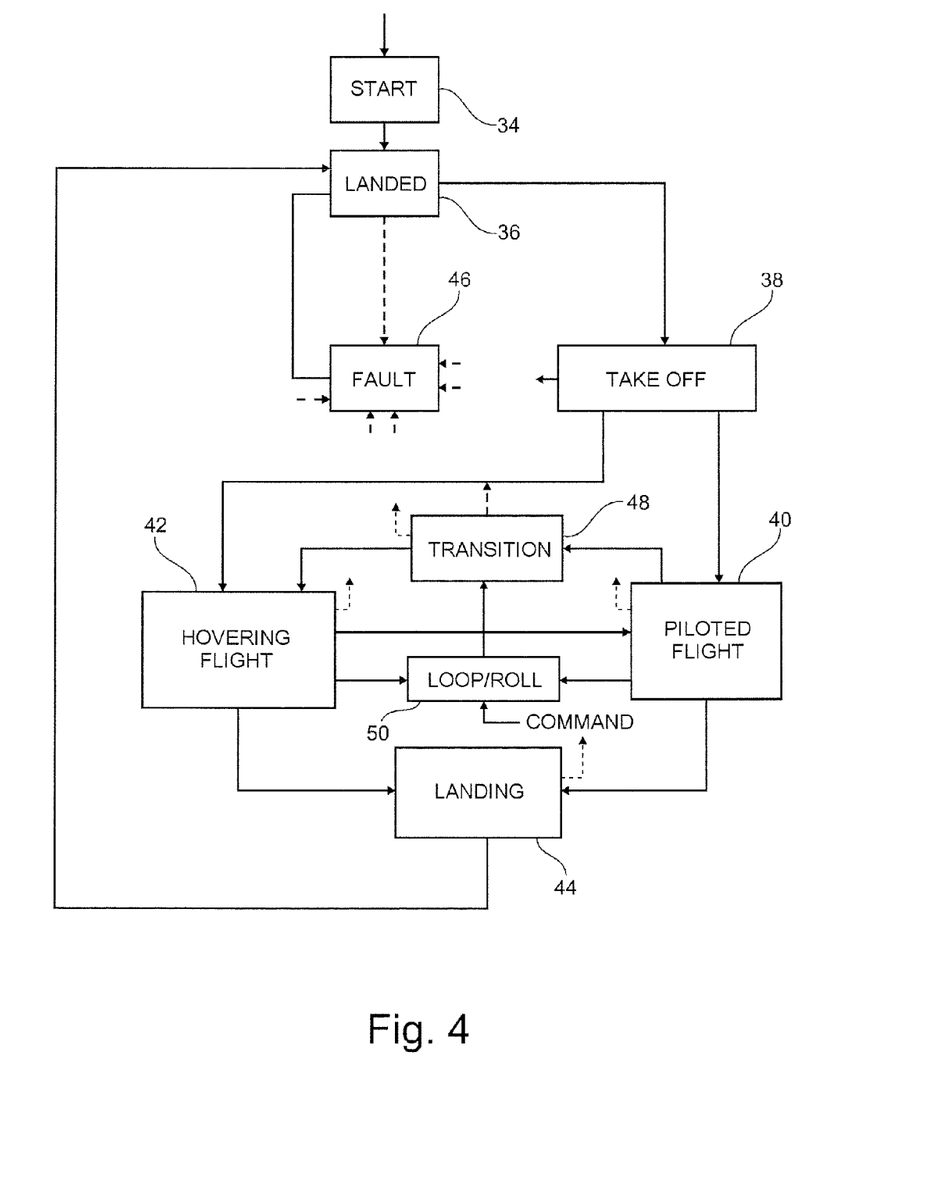
FIG. 4 is a state diagram showing the various functional configurations in which the drone may be found.

These various stages are described in greater detail below, after describing the general architecture of the controls of the drone and of the control and servo-control members thereof. Incorporating the Roll/Loop Function in the Sequencing Diagram of the Drone FIG. 4 is a state diagram showing the various functional configurations in which the drone may be found.

Immediately after being switched on and performing a certain number of initialization steps (block 34), the drone is in a "landed" state (block 36) with its motors ready to take off. A command sent by the user then causes the motors to be spun up and the drone to take off (block 38). Thereafter, two main modes of functioning are possible:

in a first "piloted flight" mode (block 40) the drone is piloted directly by the user, as explained above by using a combination of signals emitted by the inclination detector of the appliance and the commands available on the touch screen; and the other mode (block 42) is an automatic mode implementing the autonomous system for stabilizing the drone in hovering flight. This autopilot mode is activated in particular at the end of the take-off stage, as soon as the user lifts the controlling finger off the touch screen of the appliance, or in the event of the radio link between the appliance and the drone being interrupted.

Piloted or hovering flight is terminated by changing to a landed state (block 44), as a result of pressing on a specific command of the appliance or in the event of a low battery. Changing to this state causes the speed of rotation of the motors to be reduced, thereby giving rise to a corresponding reduction in altitude. Once contact with the ground has been detected, the state returns to the "landed" state of block 36.

A fault state (block 46) is also provided that corresponds to an emergency state in the event of an anomaly being detected, causing the motors to be stopped immediately. This fault state may be reached from any of the above-described states, in particular in the event of a motor failure (blocked rotor), a software anomaly, or as a result of the accelerometer detecting an impact.

The drone also has means (block 48) for transiting progressively from piloted flight (moving state, block 40) to hovering flight (block 42), in order to allow the drone to change from the moving state in which it is moving with a non-zero angle of inclination and thus with a horizontal speed that may be relatively high, to a hovering state in which it is stationary and held in a fixed position by the stabilization and autopilot system. This stop procedure is implemented in a minimum length of time without reversing its horizontal speed.

The activation block 50 for activating a loop or roll type flip maneuver in accordance with the invention is activated on receiving a corresponding command generated manually by an action of the user (pressing on a button displayed on the touch screen of the remote control appliance, shaking the appliance, etc.) or automatically, e.g. when a certain number of conditions as specified in a video game scenario being executed by the remote control device all occur simultaneously.

The command comprises an indication of the type of flip maneuver (loop or roll, thereby determining the axis of rotation about which the pivoting of the drone is to take place), and also its direction of execution (to the right or the left for a roll, forwards or backwards for a loop).

The maneuver may be executed equally well from a situation in which the drone is being piloted by the user (block 40) or from an autopilot situation, while hovering (block 42). Once the maneuver has been executed, the following state is a transition state (block 48) towards the hovering state (block 42) in order to stabilize the drone in a stationary position.

General Architecture of the Control and Servo-Control Members of the Drone

Figure 5:
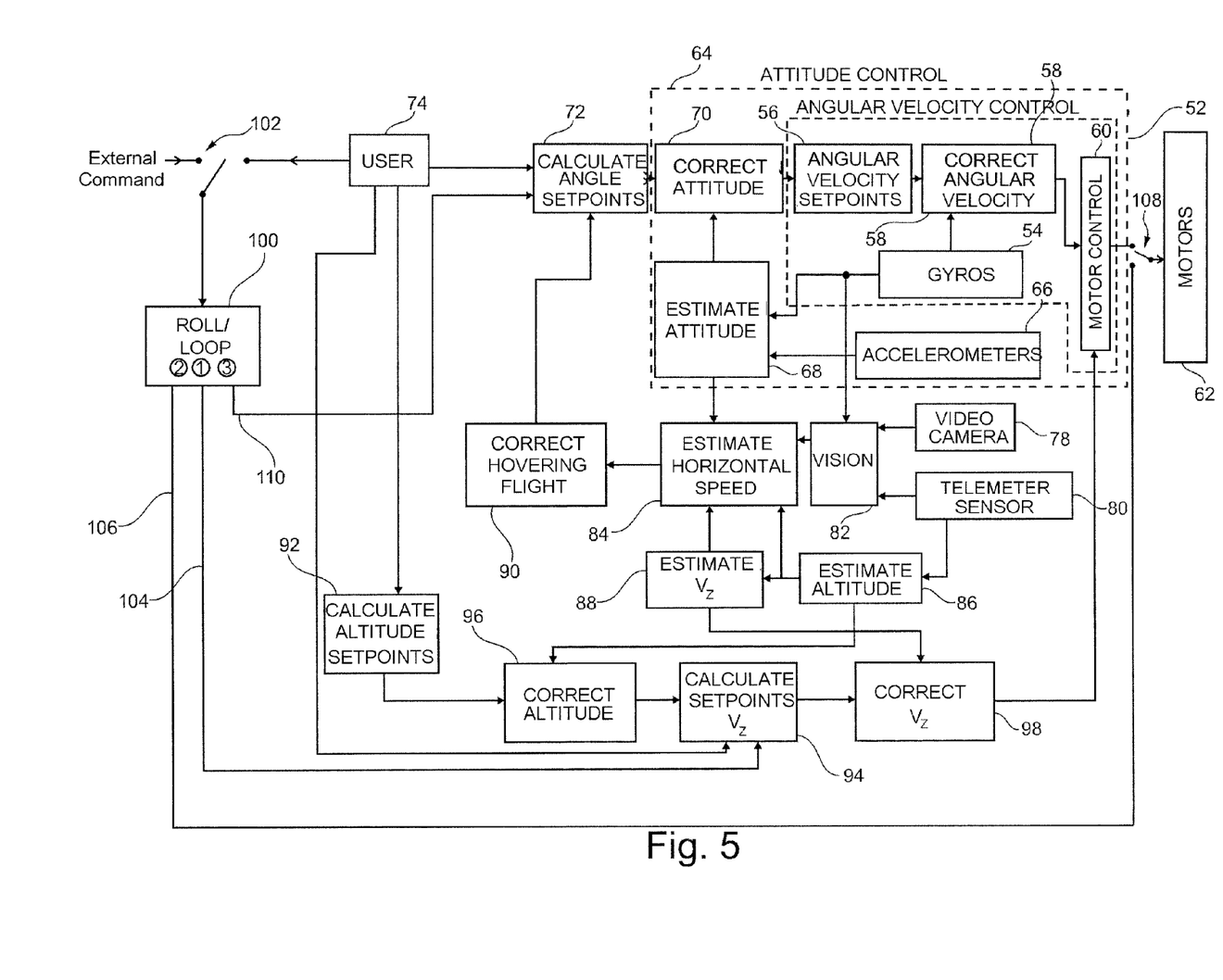
FIG. 5 is a block diagram showing the various control and servo-control members and also the automatic piloting of the drone.

FIG. 5 is a functional block diagram of the various control and servo-control members and also of the autopilot of the drone. Nevertheless, although this diagram is presented in the form of interconnected circuits, it should be observed that these various functions are implemented essentially by software, and that this representation is merely for illustrative purposes.

The piloting system implements a plurality of nested loops for controlling the angular velocity and the attitude of the drone, and for stabilizing hovering flight, in addition to controlling variations in altitude automatically or under the effect of a command from the user.

The innermost loop, which is the loop 52 for controlling angular velocity, makes use firstly of signals delivered by the gyros 54 and secondly of a reference constituted by angular velocity setpoints 56, these various items of information being applied as inputs to an angular velocity correction stage 58. This stage 58 controls a stage 60 for controlling the motors 62 so as to control separately the speeds of the various motors in order to correct the angular velocity of the drone by combined action on the rotors driven by the motors.

The angular velocity control loop 52 is nested in an attitude control loop 64, which operates on the basis of information supplied by the gyros 54 and the accelerometers 66, this data being applied as input to an attitude estimator stage 68 having its output applied to a proportional-integral (PI) type attitude corrector stage 70. The stage 70 delivers angular velocity setpoints to the stage 56, which setpoints are also a function of angle setpoints generated by a circuit 72 from data generated internally by the autopilot of the drone or else from commands applied directly by the user 74.

Starting from the error between the setpoint (applied by the user or generated internally by the autopilot) and the angle measurement given by the attitude estimator circuit 68, the attitude control loop 64 (circuits 54 to 70) calculates an altitude velocity setpoint using the PI corrector of the circuit 70. The angular velocity control loop 52 (circuits 54 to 60) then calculates the difference between the previous angular velocity setpoint and the angular velocity as actually measured by the gyros 54. The loop uses this information to calculate the various speeds of rotation setpoints (and thus the upward force) to be applied to the motors 62 of the drone in order to perform the maneuver planned by the autopilot or requested by the user.

For autopilot operation, the setpoints are generated internally. The vertically-pointed video camera 78 and the telemeter sensor 80 acting as an altimeter produce the information that is applied to a processor circuit 82 that also receives data from the gyros 54 in order to apply the necessary corrections to the horizontal speed as estimated by the circuit 84. This horizontal speed estimate may be corrected by a vertical speed estimate, given by the circuit 88 on the basis of an altitude estimate supplied by the circuit 86 receiving information from the telemeter sensor 80.

While hovering, the horizontal speed as estimated by the circuit 84 enables the circuit 90 to calculate speed setpoints that are then applied as input to the attitude control loop after being transformed into angle setpoints by the circuit 72 so as to bring the drone to a speed of zero and so as to maintain it in a configuration in which both speed and angle of inclination are zero.

Concerning the vertical movements of the drone, the user 74 applies a climb speed setpoint $V_z$ directly to a circuit 94, or an altitude setpoint to a circuit 92 which uses the circuit 96 to calculate a climb speed setpoint from the estimated altitude given by the circuit 86.

Either way, the climb speed (prescribed or calculated) is applied to a circuit 98 that compares the setpoint with the estimated climb speed $V_z$ given by the circuit 88, and modifies accordingly the command data applied to the motors (circuit 60) so as to increase or decrease the speed of rotation of all of the motors simultaneously so as to minimize the difference between the setpoint climb speed and the measured climb speed.

In order to execute flip maneuvers of the roll or loop type, specific commands are provided that are represented by the block 100 operated either on command from the user 74 or on the basis of external commands (switch 102), e.g. commands generated by the scenario of a video game being executed by the user's remote control appliance. Under such circumstances, the command as generated automatically is transmitted to the drone together with the piloting signals.

The block 100 serves to control the three above-mentioned stages that describe the execution of the maneuver:

- stage 1 (vertical impulse): via a link 104 to the block 94 for calculating climb speed setpoints;
- stage 2 (rotation with open-loop control): via a direct link 106 to the motors 62, the motors being decoupled from the various servo-control loops by the switch represented diagrammatically at 108; and
- stage 3 (planned rotation under servo-control): by a link 110 to the block 72 for calculating angle setpoints, which setpoints are calculated in the manner explained below as a function of a predetermined model that describes the behavior of the drone during the planned rotation stage.

Modeling the Behavior of the Drone

The speed data of the drone is given in the (u, v, w) frame of reference shown in FIG. 2, i.e. in a frame of reference that is tied to the body of the drone.

The following notation is used:
- u and v are the components of speed in horizontal translation (u in the main forward direction Δ of the drone and v in the transverse direction), and w is the speed in vertical translation, all in a frame of reference tied to the drone (and thus independent of any inclination it might have relative to the terrestrial frame of reference);
- p, q, and r are the angular velocities about the pitching, roll, and yaw axes 28, 30, and 32, respectively (FIG. 2); and
- $\phi$, $\theta$, and $\psi$ the Euler angles of the drone defining its orientation relative to a (Galilean) terrestrial frame of reference, $\phi$ and $\theta$ being the two angles defining inclination relative to the horizontal.

Each of these four propellers i of the drone (i=1, ..., 4) exerts a torque $\Gamma_i$ and a climb thrust force $F_i$ proportional to the square of the speed of rotation $\omega_i$ of the motor:

$$\begin{cases} F_i = a\omega_i^2 \\ \Gamma_i = b\omega_i^2 \end{cases}$$

The fundamental dynamic equations are applied in projection into the moving frame of reference of the drone, thereby giving the following three equations:

$$\dot{u} = (rv - qw) - g\sin\theta - Cxu$$ (Equation 1-3)
$$\dot{v} = (pw - ru) + g\sin\varphi\cos\theta + Cyv$$
$$\dot{w} = (qu - pv) + g\cos\varphi\cos\theta - \frac{1}{m}\sum_{i=1}^{4} a\omega_i^2$$

where:
- g is the acceleration due to gravity;
- Cx and Cy are the coefficients of resistance to movement (representing the friction forces to which the drone is subjected) along the two horizontal axes;
- a is a coefficient associating thrust and climb speed with the speed of rotation ω; and
- m is the mass of the drone.

The dynamic moment theorem is applied in the same manner to the system, still in projection into the moving frame of reference, thereby leading to the following three equations:

$$I_x\dot{p} + qr(I_z - I_y) = la(\omega_2^2 - \omega_4^2)$$

$$I_y\dot{q} + pr(I_x - I_z) = la(\omega_1^2 - \omega_3^2)$$

$$I_z\dot{r} + pq(I_y - I_x) = b(\omega_1^2 - \omega_2^2 + \omega_3^2 - \omega_4^2)$$ (Equations 4-6)

where: $I_x$, $I_y$, and $I_z$ are parameters representative of the moments of inertia of the drone about the three axes, and l is the distance between the motor and the center of gravity of the drone.

In these equations, the first term on the left corresponds to the dynamic moment of the system, the second term represents the contribution of Coriolis forces to the dynamic moment, and the member on the right corresponds to the moments exerted by the climb forces $F_i$ and the torques $\Gamma_i$ created by the propellers of each of the rotors.

Finally, the following relationship applies, using the three Euler angles $\phi$, $\theta$, and $\omega$:

$$\dot{\varphi} = p + (q\sin\varphi + r\cos\varphi)\tan\theta$$ (Equation 7-9)
$$\dot{\theta} = q\cos\varphi - r\sin\varphi$$
$$\dot{\psi} = \frac{q\sin\varphi + r\cos\varphi}{\cos\theta}$$

The behavior of the system is thus fully described by nine equations in nine unknowns (equations 1-9 above).

In the vicinity of the point of equilibrium, with the drone hovering horizontally (with zero speed and angles of inclination), the following applies:

$$u = v = w = \theta = \phi = 0$$

Equations 1-9 then become:

$$g = \frac{1}{m}\sum_{1}^{4} a\omega_i^2,$$

$$p = q = r = 0, \omega_1 = \omega_3, \omega_2 = \omega_4, \omega_1 = \omega_2$$

Thus, in the vicinity of the point of equilibrium:

$$\omega_1 = \omega_2 = \omega_3 = \omega_4 = \frac{1}{2}\sqrt{\frac{mg}{a}} = \omega_0$$

Writing $w_i = \omega_i - \omega_0$, with i=1, ..., 4, and linearizing the above equations 1 to 9 to the first order about the point of equilibrium, gives rise to the following system of linearized equations:

$$\begin{cases} \dot{u} = -g(\theta) - Cx*u \\ \dot{v} = g(\varphi) + Cy*v \\ \dot{w} = -\dfrac{2a\omega_0}{m}(w_1 + w_2 + w_3 + w_4) \\ \dot{p} = \dfrac{la\omega_0}{I_x}(w_2 - w_4) \\ \dot{q} = \dfrac{la\omega_0}{I_y}(w_1 - w_3) \\ \dot{r} = \dfrac{b\omega_0}{I_z}(w_1 + w_3 - w_2 - w_4) \\ \dot{\varphi} = p \\ \dot{\theta} = q \\ \dot{\psi} = r \end{cases} \quad \text{(Equation 10-18)}$$

This provides a model of the behavior of the drone that is used in particular for predicting its behavior during the planned rotation stage (stage No. 3) and for calculating the angle setpoint to be applied.

Stage 1 (Vertical Impulse)

The purpose of this step is to give the drone sufficient impetus in a vertical direction to ensure that when it has completed the maneuver it is at substantially the same altitude as before. In other words, the idea is to make the drone climb quickly so that it does not lose altitude while performing the maneuver, i.e. while it no longer has lift from the propellers and even, in the portion of the maneuver when it is in an upside-down configuration, when it is subjected to thrust in the opposite direction, towards the ground.

The maneuver thus consists in sending a maximum speed reference to the vertical speed servo-control loop, while conserving control over the attitude of the drone, e.g. a vertical speed setpoint of 1000 millimeters per second (mm/s) for rotation through one complete turn (or twice that setpoint, i.e. 2000 mm/s it if is desired to perform two consecutive turns without interruption).

Once the setpoint speed of 1000 mm/s has been achieved, the following stage is engaged.

Stage 2 (Rotation with Open Loop Control)

The algorithm sends a sequence of open-loop commands directly to the four motors of the drone, for the purpose of causing the desired rotation about the roll axis $\phi$ (or about the pitching axis for a loop). This stage may be subdivided into two substages:

for an angle $\phi$ lying in the range 0 to 90° (stage 2A in FIG. 3), maximum speed of rotation commands are applied to motors Nos. 1 and 4 (the two motors situated on one side of the roll axis) and the minimum speed of rotation commands to the motors Nos. 2 and 3 (two motors situated on the other side of the same axis);

for an angle $\phi$ lying in the range 90° to 270° (stage 2B in FIG. 3), a minimum speed of rotation setpoint is sent to all four motors. Commands applied during the first substage serve to give the drone a rotary impulse with sufficient impetus for it to be able to continue the rotation over the following half turn. Since the drone is no longer delivering lift during this half turn, and since it even spends time in an upside-down configuration, it is appropriate to minimize the contrary effects of thrust from the propellers by causing them to rotate at their minimum speed of rotation.

Once the drone has reached a roll angle of value $\phi=270°$, it is possible to move onto the third stage.

Stage 3 (Planned and Servo-Controlled Rotation)

It is desired that the recovery from the roll should be automatic, without user intervention, by setpoints being applied that enable transition to take place progressively in the shortest possible time and without going beyond the angular position $\phi=0$, i.e. without oscillating about the final position.

To do this, the behavior of the drone is previously identified by a transfer function representing the real angular response of the drone to a setpoint. It is thus possible to predict how the drone will behave and to apply the optimum angular setpoint for stopping the drone i) in as short a time as possible, and ii) without going past the target angular position (roll angle of zero, $\phi=0°$).

More precisely, it is necessary to take account of the inertia of the drone, which leads to a difference between the angle setpoint $\phi_{ref}$ and the corresponding angle as measured $\phi_{mes}$. To do this, the transfer function $\phi_{mes}/\phi_{ref}$ is identified and is assumed to represent a system of second order. Using Laplace notation, (where p is the Laplace variable), this gives:

$$\frac{\varphi_{mes}(p)}{\varphi_{ref}(p)} = \frac{K}{(1+\tau_1*p)*(1+\tau_2*p)}$$

After simplifying the model, this gives:

$$\frac{\varphi(p)}{\varphi ref(p)} = \frac{\frac{60}{90}}{\frac{p^\wedge 2}{90} + \frac{12}{90}*p + 1}$$

Using this model in Laplace notation, a differential equation is obtained as a function of time that gives the value of the setpoint at each instant, as follows:

$$\phi\text{ref}(t) = \frac{1}{60}*(\ddot{\phi}(t) + 12*\dot{\phi}(t) + 90*\phi(t))$$

Using this expression, it is appropriate to select the form of the function $t \to \phi(t)$ that enables the difference between the setpoint and the measurement to be recovered during the final stage of the roll.

Use is made in this example of a third-order polynomial in t (the time parameter) in order to achieve the desired movement.

The following polynomials $t \to \dot{\phi}(t)$ and $t \to \ddot{\phi}(t)$ are deduced therefrom by differentiating successively with respect to time, thereby making it possible, using the above relationship, to calculate a setpoint that takes account of the inertia in the angle servo-control loop of the drone.

Figure 6:
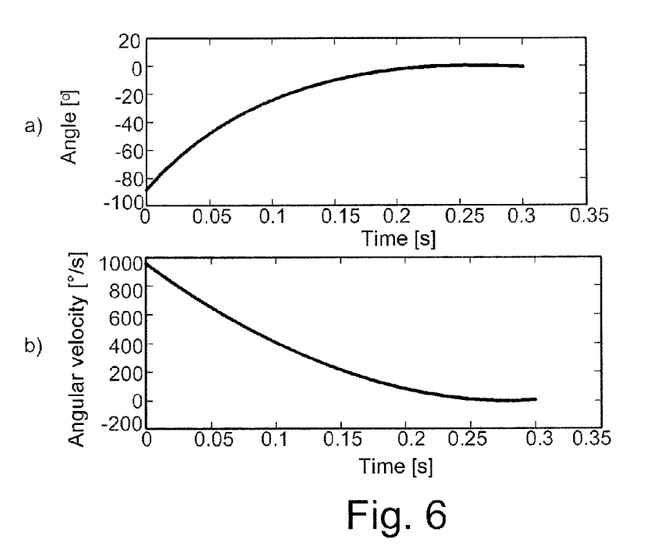
FIGS. 6a and 6b are characteristic curves describing as a function of time respectively the angle and the angular velocity of the ideal reference trajectory during the final stage of a planned rotation.

FIGS. 6a and 6b show the reference trajectory given by these polynomials, respectively in terms of angle and of angular velocity.

One of the parameters of the calculation is the value for the time required to come to rest between the intermediate angular position $\phi=270°$ (or $\phi=-90°$) and the final angular position $\phi=0°$. By way of example, a stopping time or "time horizon" T is used that is equal to 0.3 seconds (s). It is also appropriate for angular velocity to be zero when $\phi=0°$.

In order to determine this polynomial, it is necessary to determine its coefficients.

This calculation is performed as follows.

As mentioned above, for a roll in the positive direction, the angular velocity is given by:

$$\dot{\phi} = p + (q \sin \phi + r \cos \phi) \tan \theta$$

It is possible to use the small-angle approximation for the angle θ (since pitching movement is assumed to be zero, i.e. θ≈0°). Under such circumstances, the above relationship may be approximated by:

$$\dot{\phi} \approx p$$

If the coefficients of the polynomial are written a, b, c, and d, then:

$$\phi(t) = a \cdot t^3 + b \cdot t^2 + c \cdot t + d$$

Starting from initial conditions, at t=0 (the instant when the drone reaches the intermediate position φ=270° between stages 2 and 3), the following are obtained:

$$\phi(0) = d = \phi_{initial} \text{ and } \dot{\phi}(0) = c = p_{initial}$$

At the end of stage 3, when t=T, the angle and the angular velocity are both equal to zero, thus giving:

$$\phi(t=Ts) = a*T^3 + b*T^2 + c*T + d = a*T^3 + b*T^2 + p_{initial}*T + \phi_{initial} = 0$$

$$\dot{\phi}(t=Ts) = a*T^2 + b*T + c = a*T^3 + b*T^2 + p_{initial} = 0$$

It is possible to deduce the values for the coefficients a, b, c, and d of the polynomials from these four expressions, as follows:

$$a = \frac{1}{T^2} * \left( \frac{2*\phi_{initial}}{T} + P_{initial} \right)$$

$$b = -\frac{1}{T} * \left( \frac{3*\phi_{initial}}{T} + 2*p_{initial} \right)$$

$$c = p_{initial}$$

$$d = \phi_{initial}$$

where:

T is the value of the stopping time;

$\phi_{initial}$ is the angle value of the intermediate angular position corresponding to the beginning of the stage of planned rotation, i.e. φ=−90° (or 270°) at t=0; and $p_{initial}$ is the angular velocity of the drone as measured at said intermediate angular position.

It should be observed that the value φ=−90° (or 270°) is given purely by way of example and is not limiting; the stage of planned rotation could be begun before or after the drone reaches an angle φ=270°.

The four coefficients a, b, c, and d serve to determine the roll angle to be given to the drone (i.e. the setpoint) so as to enable it to come to rest after performing a roll. They take account of the initial angular velocity, at the beginning of stage 3, of the angle reached at that moment, and of the time T allowed for stopping the drone.

At the initial instant t=0 and φ=270°, beginning of stage 3), the initial roll angle φ and the initial angular velocity p given by the sensors of the drone are stored, and the algorithm calculates the coefficients a, b, c, and d for the polynomial:

$$\phi(t) = a \cdot t^3 + b \cdot t^2 + c \cdot t + d.$$

Thereafter, the algorithm calculates at each instant (for each sample k of the calculation) the following values:

$$\phi(k) = a*t(k)^3 + b*t(k)^2 + c*t(k) + d$$

$$\dot{\phi}(k) = 3*a*t(k)^2 + 2*b*t(k) + c$$

$$\ddot{\phi}(k) = 6*a*t(k) + 2*b$$

where $t(k) = k \cdot T_e$, where $T_e$ is the sampling period of the calculation.

This produces the setpoints that are applied to the attitude control loop of the drone. This control is considered as being optimized so as to bring the maneuver to an end in the set time.

The model that is used is nevertheless an approximate model of the second order and therefore contains identification errors. The desired angle value (corresponding to the predefined reference trajectory) thus departs little by little therefrom.

In order to compensate for this departure, the algorithm is reinitialized by recalculating the coefficients of the polynomial, e.g. at t=0.15 s, corresponding to half of the predefined stopping period T.

In other words, in the middle of stage 3 of the maneuver, in order to avoid the measurement of the roll angle departing too much from the reference trajectory, the maneuver is planned once more with a shorter time horizon (0.15 s instead of 0.3 s) so as to reset the movement of the drone as closely as possible to the reference trajectory (the target trajectory).

Figure 7:
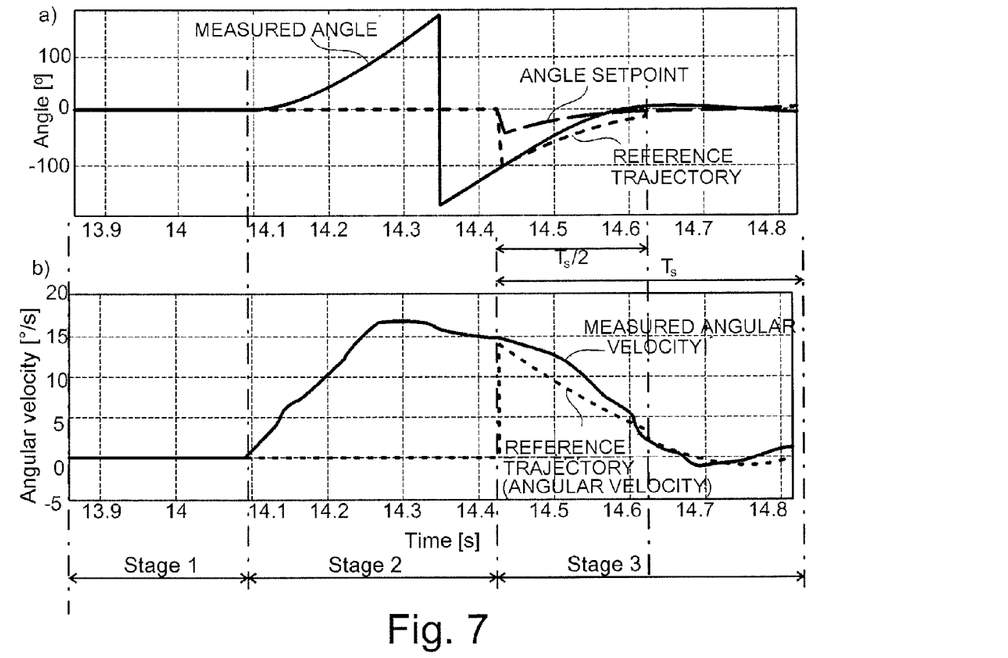
FIGS. 7a and 7b are characteristic curves describing the measured variations as a function of time respectively in the values of angle and of angular velocity relative to the ideal reference trajectory and relative to the setpoints applied during the final stage of a planned rotation.

FIGS. 7a and 7b show the results of tests performed in flight, respectively giving the variations in the angle values φ and in the angular velocity values p as measured a function of time relative to the reference trajectory (expressed in terms of angle in FIG. 7a and in terms of angular velocity in FIG. 7b) and relative to the calculated setpoints as applied during the final stage of planned rotation.

These figures show the difference that increases progressively between the measured angle (or the measured angular velocity) and the predefined reference trajectory, which difference justifies recalculating the coefficients of the polynomial after a length of time T/2=0.15 s.

What is claimed is:

1. A method of dynamically controlling the attitude of a rotary-wing drone having multiple rotors driven by respective individually-controlled motors, for automatically executing a roll or loop type preprogrammed maneuver in which the drone performs a complete turn about an axis of rotation constituted by the roll axis or the pitching axis respectively of the drone, the method comprising, on receiving an instruction to trigger the preprogrammed maneuver, executing a sequence of steps of:

a) simultaneously controlling the motors in such a manner as to impart a prior upward vertical thrust impulse to the drone; and b) controlling the motors in such a manner as to cause the drone to rotate about the axis of rotation from an initial angular position to a final angular position with zero angular velocity, this step including a stage of subjecting the motors to open-loop control, wherein step b) comprises the successive substeps of:

b1) applying individual non-servo-controlled control to the motors so as to cause the drone to rotate about the axis of rotation from an initial angular position to a predetermined intermediate angular position; and then b2) applying individual control to the motors, servo-controlled to a reference target trajectory, so as to finish off the rotation of the drone through one complete turn about the axis of rotation, progressively from the intermediate angular position with a non-zero angular velocity to a final angular position with a zero angular velocity, wherein step b2) comprises the substeps consisting in:

b21) imparting a value for stopping time between the intermediate angular position and the final angular position;

b22) measuring the angular velocity of the drone on reaching the predetermined intermediate angular position;

b23) from said stopping time imparted in step b21) and from the measurement acquired in step b22), setting parameters of a predetermined predictive function that models optimum continuous variation of the angular position of the drone as a function of time from the intermediate angular position to the final angular position at the end of the imparted time; and b24) on the basis of the predictive function as set in step b23), generating setpoint values corresponding to a target angular position precalculated at a given instant, and applying said setpoint values to a servo-control loop controlling the motors of the drone.

2. The method of claim 1, wherein the reference target trajectory of step b2) is a target trajectory in terms of angular velocity or a target trajectory in terms of angle.

3. The method of claim 1, wherein the setpoint values are setpoints for the angle of inclination of the drone relative to its roll axis or relative to its pitching axis, as the case may be.

4. The method of claim 1, wherein the predetermined predictive function is a polynomial function, and the step b23) of setting the parameters of said function is a step of determining coefficients of the polynomial.

5. The method of claim 4, wherein the polynomial function is a third-order polynomial function.

6. The method of claim 5, wherein the polynomial function is a function of the following type:

$$\phi(t) = a \cdot t^3 + b \cdot t^2 + c \cdot t + d$$

where:
$\phi(t)$ is the angular position corresponding to the setpoint value generated in step b24); and
a, b, c, and d are the coefficients of the polynomial as set in step b23), such that:

$$a = \frac{1}{T^2} * \left( \frac{2 * \varphi_{initial}}{T} + P_{initial} \right)$$

$$b = -\frac{1}{T} * \left( \frac{3 * \varphi_{initial}}{T} + 2 * p_{initial} \right)$$

$$c = p_{initial}$$

$$d = \varphi_{initial}$$

where:
T is the value of the stopping time imparted in step b21);
$\phi$ initial is the angular value of the intermediate angular position; and
$p_{initial}$ is the angular velocity of the drone as measured in step b22) for the intermediate angular position.

7. The method of claim 1, including at least one reiteration of steps b22) and b23) when the drone reaches a predetermined angular position for redefining setpoints, this angular position for redefining setpoints lying between the intermediate angular position of step b2) and the final angular position, and the redefinition angular position being taken as a new intermediate angular position for setting the parameters in step b23).

8. The method of claim 1, wherein step a) of simultaneously controlling the motors so as to impart an upward prior vertical thrust impulse to the drone is a step that is executed while conserving control over the attitude of the drone.

9. The method of claim 1, further comprising, once the final angular position has been reached, a final step of:
c) transition to a hovering state of the drone with activation of a hovering flight control loop suitable for stabilizing the drone with a horizontal linear speed that is zero and an angle of inclination relative to ground that is zero.

10. A rotary-wing drone comprising multiple rotors driven by respective individually-controlled motors and a digital memory containing a software control program implementing a method of dynamically controlling the attitude of the rotary-wing drone,
for automatically executing a roll or loop type preprogrammed maneuver in which the drone performs a complete turn about an axis of rotation constituted by the roll axis or the pitching axis respectively of the drone,
the method comprising, on receiving an instruction to trigger the preprogrammed maneuver, executing a sequence of steps of:
a) simultaneously controlling the motors in such a manner as to impart a prior upward vertical thrust impulse to the drone; and
b) controlling the motors in such a manner as to cause the drone to rotate about the axis of rotation from an initial angular position to a final angular position with zero angular velocity, this step including a stage of subjecting the motors to open-loop control,
wherein step b) comprises the successive substeps of:
b1) applying individual non-servo-controlled control to the motors so as to cause the drone to rotate about the axis of rotation from an initial angular position to a predetermined intermediate angular position; and then
b2) applying individual control to the motors, servo-controlled to a reference target trajectory, so as to finish off the rotation of the drone through one complete turn about the axis of rotation, progressively from the intermediate angular position with a non-zero angular velocity to a final angular position with a zero angular velocity,
wherein step b2) comprises the substeps consisting in:
b21) imparting a value for stopping time between the intermediate angular position and the final angular position;
b22) measuring the angular velocity of the drone on reaching the predetermined intermediate angular position;
b23) from said stopping time imparted in step b21) and from the measurement acquired in step b22), setting parameters of a predetermined predictive function that models optimum continuous variation of the angular position of the drone as a function of time from the intermediate angular position to the final angular position at the end of the imparted time; and
b24) on the basis of the predictive function as set in step b23), generating setpoint values corresponding to a target angular position precalculated at a given instant, and applying said setpoint values to a servo-control loop controlling the motors of the drone.

* * * * *